2,704,772

PROCESS FOR THE PRODUCTION OF HYDROGENATED DERIVATIVES OF PHENYL-P-BENZOQUINONE

De Walt S. Young, Kingsport, Tenn., assignor to Eastman Kodak Company, Rochester, N. Y., a corporation of New Jersey No Drawing. Application May 5, 1951,
Serial No. 224,822

10 Claims. (Cl. 260—618)

This invention relates to derivatives of phenyl-p-benzoquinone which are obtained by the chlorination and/or hydrogenation of phenyl-p-benzoquinone. This invention also covers esters and ethers of the products obtained by the hydrogenation of phenyl-p-benzoquinone. Many of the products obtained by the processes disclosed in this invention are novel and are useful as insecticides, fungicides, protein denaturants, insect repellants, dye intermediates, high boiling solvents, plasticizers for synthetic resins, etc.

The hydrogenation and/or chlorination of p-benzoquinone and some derivatives thereof are not novel. Such processes as are known to the art are numerous in nature and involve a wide variety of procedures whereby many different results have been obtained. As a consequence, it is very difficult, if not impossible in some instances, to predict precisely what results will be obtained by the following of any given procedure. Thus, prior to this invention, it could not be predicted with any degree of certainty what products would be obtained by the hydrogenation of phenyl-p-benzoquinone. Since phenyl-p-benzoquinone is a dioxo derivative of diphenyl, it might appear upon first glance that hydrogenation of this compound would result in the hydrogenation of the carbon atoms in the unsubstituted benzene ring prior to the hydrogenation of carbon atoms in the benzene ring containing the oxo atoms. However, investigation into the chemical phenomena involved in such hydrogenation has revealed that the initial hydrogenation takes place on the dioxo substituted ring. Furthermore, my investigation has revealed that by properly controlling the temperatures and pressures as well as other conditions, all of the unsaturated bonds in the dioxo substituted ring can be reduced by the addition of hydrogen so as to produce phenyl quinitol; moreover, phenyl quinitol can then be hydrogenated still further so as to result in the preparation of cyclohexyl quinotol by the proper control of temperatures and pressures as well as other conditions involved. Of course, cyclohexyl quinitol can be prepared directly from phenyl-p-benzoquinone without the isolation of the intermediate product, viz. phenyl quinitol. The process for preparing phenyl hydroquinone is covered by a copending application by De Walt S. Young and George F. Rodgers, Serial No. 224,821, filed on even date herewith (May 5, 1951).

As exemplary of some of the prior art processes for reducing or hydrogenating benzoquinone derivatives, zinc dust and glacial acetic acid have been employed in the reduction of duroquinone, cf. Nef, Annalen der Chemie, vol. 237, p. 6. Similarly, zinc dust and caustic soda solution have been employed as well as phenyl hydrazine, aniline, and stannous chloride. Such prior art processes have been discussed in a group of patents relating to the production of various alkyl derivatives of hydroquinone by the catalytic hydrogenation of the corresponding alkyl substituted p-benzoquinones. However, the processes disclosed are not related to those employed in the present invention inasmuch as the substituent on the p-benzoquinone nucleus of the present invention is a phenyl radical. In U. S. Patent 2,100,468, dated November 30, 1937, a process is disclosed for the hydrogenation of naphthenyl phenol. According to this patent, naphthenyl phenol is hydrogenated in an autoclave employing nickel-on-kieselguhr catalyst and hydrogen under a pressure of from 1800 to 2500 pounds per square inch at a temperature of from 170 to 180° C. The products obtained are of course monohydric in nature. There is no suggestion whatsoever in this patent that a similar process might be operative as regards treatment of dihydric phenolic compounds; moreover, the process of the patent involves the hydrogenation of an oxy containing ring attached to a hydrogenated cyclic nucleus, whereas the process of the instant invention operates in the inverse sequence to produce a novel dihydric compound, viz. cyclohexy quinitol.

Phenyl hydroquinone itself is an old compound, having been prepared as early as 1900 by Borsche, Ann. 312, 221.

As regards halogenated derivatives of phenyl-p-benzoquinone, British Patent 387,565, accepted February 9, 1933, discloses aryl and halogen substituted benzoquinones having a formula and choice of ingredients which are broadly related to 2-phenyltrichloro-1,4-benzoquinone. Other patents which relate to halogen substituted benzoquinones and hydroquinones containing alkyl and aryl substituents include U. S. 2,398,418 dated April 16, 1946, U. S. 2,422,229 dated June 17, 1947, and U. S. 1,892,000 dated December 27, 1932. However, none of these patents disclose the preparation of trihalo derivatives of phenyl hydroquinone nor do these patents in any way make it clear that the chlorination of phenyl-p-benzoquinone would result in the chlorine substituents being attached to the quinone nucleus to the exclusion of the phenyl substituent being chlorinated. Furthermore, the process employed in this phase of the present invention for the preparation of 2-phenyltrichlorohydroquinone is not suggested by this prior art.

According to my invention, I have found that the process for the manufacture of phenyl hydroquinone from phenyl-p-benzoquinone by hydrogenation thereof in a suitable solvent under certain reaction conditions as described below is capable of suitable regulation of the reaction conditions whereby the hydrogenation can be continued beyond the preparation of phenyl hydroquinone so as to produce phenyl quinitol and under another set of reaction conditions, the hydrogenation can be caused to continue still further so as to result in the preparation of cyclohexyl quinitol. Moreover, the invention also encompasses the preparation of the esters of phenyl quinitol and cyclohexyl quinitol. In addition, novel tri-chlorinated derivatives of phenyl hydroquinone can be prepared.

It is an object of the invention to provide a new process for the preparation of phenyl quinitol and cyclohexyl quinitol. A further object of the invention is to provide a new process for the preparation of 2-phenyltrichlorohydroquinone. Another object of the invention is to provide phenyl quinitol and esters thereof, cyclohexyl quinitol and esters thereof, and 2-phenyltrichlorohydroquinone. An additional object of the invention is to provide processes for preparing the esters of phenyl quinitol and cyclohexyl quinitol. Other objects will become apparent hereinafter.

According to the invention, phenyl-p-benzoquinone is suspended or dissolved in a suitable solvent. Solvents which can be advantageously employed include the lower aliphatic alcohols such as ethanol, isopropanol, butanol, etc. A hydrogenation catalyst is then added to the solution or suspension in a quantity sufficient to initiate the subsequent hydrogenation reaction under the conditions employed. It has been found that Raney nickel is a hydrogenation catalyst which can be advantageously employed. However, other hydrogenation catalysts include the precious metal catalysts and related catalytic materials prepared therewith, such as palladiumized charcoal, platinized charcoal, platinum oxide, and so on. It is preferable to employ a hydrogenation catalyst which can be readily separated from the reaction mixture upon the completion of the hydrogenation process so as to facilitate the purification of the desired product. The amount of catalyst employed can be as high as 15 to 20 per cent or higher, based on the weight of the phenyl benzoquinone being hydrogenated. However, much smaller quantities can also be employed, as can be readily determined by those familiar with the catalytic hydrogenation of organic compounds.

By way of example as to additional solvents or diluents as reaction media besides the lower aliphatic alcohols, there can be mentioned other organic solvents which are inert to the hydrogenation conditions and which include, for example, diethyl ether and other alkyl ethers.

The mixture of phenyl-p-benzoquinone, catalyst, and reaction medium is placed in an autoclave and subjected to hydrogen under pressure. The reaction can be advantageously conducted over a wide range of pressure, that is, from about 100 pounds per square inch to about 2,000 pounds per square inch (p. s. i.). Thus, at a pressure of about 1,000 p. s. i. the contents of the autoclave have been brought to a temperature of about 60° to 70° C. with constant stirring whereby these conditions result in the hydrogenation of phenyl-p-benzoquinone to form phenyl hydroquinone as disclosed in the copending application referred to above. The completion of the reaction is evidenced by the cessation of hydrogen absorption within a period of several hours. Temperatures lower than 60° C. can be employed without much change in the compound obtained e. g. 45°–60° C.; however, the time required and the yield obtained are reduced considerably to the extent that the temperature employed is less than 60° C. When temperatures higher than 70° C. are employed, some hydrogenation on the phenolic benzene ring may be brought about.

At temperatures in the range of 95 to 105° C., the phenolic benzene nucleus can be hydrogenated completely, whereby phenyl quinitol is prepared. Thus the hydrogenation at 60 to 70° under 1000 p. s. i. of hydrogen pressure is carried to completion and the temperature can then be raised to 95 to 105° C. whereupon additional hydrogen will be absorbed by the reaction mixture. Upon the completion of this additional absorption, phenyl quinitol is obtained. In order to prepare phenyl quinitol, phenyl-p-benzoquinone can be employed as the starting material without separating the intermediate product, viz. phenyl hydroquinone; or the intermediate product can be prepared as described above and isolated by filtering off the catalyst and removing the reaction medium followed by distillation of the crude product at a reduced pressure and the resulting purified phenyl hydroquinone can then be dissolved in the same or a similar solvent or diluent as a reaction medium and subjected to hydrogenation at 95 to 105° C. under the conditions described above for the hydrogenation of phenyl-p-benzoquinone. Phenyl quinitol can be isolated and purified in the same manner that is described above for the isolation and purification of phenyl hydroquinone.

In a manner similar to that employed above in the preparation of phenyl quinitol, it is also possible to further hydrogenate the phenyl quinitol obtained so as to produce cyclohexyl quinitol. For the accomplishment of this result, the phenyl quinitol in a suitable medium, such as those disclosed above, is hydrogenated at a temperature of 135 to 150° C. under a pressure of about 1,000 p. s. i., employing a hydrogenation catalyst. It is obvious that the preparation of cyclohexyl quinitol can be commenced, employing either phenyl-p-benzoquinone or phenyl hydroquinone or phenyl quinitol by dissolving or suspending any of these starting materials in a suitable solvent, adding a suitable catalyst, and reacting the resultant mixture with hydrogen under a suitable elevated pressure carrying out each of the temperature range hydrogenation steps that may be necessary.

Regardless of the extent to which the hydrogenation is carried, the desired product can be separated and purified in a completely analogous manner in that it is first filtered from the catalyst after which the solvent can be evaporated and then the crude product distilled at reduced pressure to complete the purification. Redistillation or fractionation can also be employed if further purification is desired.

Phenyl-p-benzoquinone which is employed in accordance with this invention can be obtained very simply and in good yield as described in U. S. Patent 1,735,432, referred to above, and also in accordance with the procedure described in the British Intelligence Objective Sub-Committee Final Report No. 1149, page 86, by reaction of diazotized aniline with an aqueous sodium bicarbonate slurry of a benzoquinone. In a similar manner, other closely related compounds which are homologous with phenyl-p-benzoquinone can also be employed. Thus, any of the compounds referred to in this specification may contain on the benzene ring in place of one or more hydrogen atoms a low molecular weight alkyl radical without markedly influencing the processes employed in the preparation of hydrogenated compounds containing such alkyl radicals or the uses and properties of the resulting products and derivatives thereof. Furthermore, some of the products of this invention may exist as stereoisomers.

The temperature ranges given for the hydrogenation involved in the preparation of phenyl quinitol and/or cyclohexyl quinitol are preferred operating temperatures. However, these temperatures can be varied over a considerable extent above and below the maximum and minimum temperatures specified. In making such deviations from the preferred range, it is obvious that some intermediate stage of hydrogenation may take place rather than the complete hydrogenation of the benzene nucleus being subjected to such treatment. For example, at a temperature of 120° C., a much longer period of time would be required in order to hydrogenate the second benzene nucleus and furthermore, such hydrogenation would not be as complete as it would be if a temperature range from 135 to 150° C. were employed. Temperatures above 150° C. can be used in the hydrogenation of the second ring; however, such temperatures are unnecessary and if too high a temperature is employed, some decomposition may ensue.

The pressure employed in the hydrogenation processes described above is not critical inasmuch as pressures only somewhat above atmospheric pressure can be employed or pressures as high as the apparatus being used can stand without danger of bursting can be employed. The pressure employed does not have a particularly significant effect upon the temperatures described as preferred for the preparation of any of the products described above inasmuch as the degree of pressure has its primary effect in the rate of the reaction and not the manner in which the reaction takes place as regards the product produced. However, the temperature ranges specified herein are to be considered those advantageously effective at a pressure of about 1000 p. s. i. employing wet Raney nickel as the preferred catalyst.

By employing the hydrogenation processes described above, excellent yields are obtained with resulting economy of the reacting chemicals. The solvent or reaction media employed can be readily recovered and reused. In a similar manner, the catalyst employed can be recovered and if necessary, reactivated and employed over again. The apparatus necessary for the conduct of the reactions is simple and readily available commercially. The products obtained require no extensive purification or separation procedures and are readily obtained in a very satisfactory degree of purity. It is quite obvious that these advantages are very worthwhile and represent a marked improvement over the problems and difficulties accompanying hydrogenation employing chemical means other than the use of hydrogen gas and a catalyst. In addition, the catalytic hydrogenation processes described above avoid the formation, removal, and disposal of by-products always encountered in reduction through agents other than hydrogen. The following examples illustrate further the manner of practicing this phase of the invention:

EXAMPLE 1

*Phenyl quinitol*

The following materials were charged into a stainless steel autoclave: 125 grams of phenyl-p-benzoquinone, 350 cc. of isopropyl alcohol, and 30 grams of wet Raney nickel. Hydrogen was introduced into the autoclave under a pressure of 1,000 p. s. i. and the reaction mixture was heated to a temperature of 60 to 70° C. with constant stirring. After about three hours' time the phenyl-p-benzoquinone had been converted to phenyl hydroquinone as was evidenced by the cessation of hydrogen absorption. The reaction mixture was then heated to a temperature of 95 to 105° C. with continued stirring and maintenance of the hydrogen pressure at the same level, whereupon further absorption of hydrogen began and continued until the hydroquinone nucleus was completely hydrogenated, which was evidenced by the cessation of hydrogen absorption. This required about four hours. Next, the reaction mixture in the autoclave was cooled and filtered to remove the catalyst. The isopropyl alcohol was then distilled off and the remaining crude product was purified by distillation under a reduced pressure of 0.7 mm. of Hg pressure. The distillate consisted of 122.3 grams (94% yield) of phenyl quinitol which was a viscous liquid and is probably a mixture of stereoisomers. This product can be further purified by redistillation or by crystallization from a suitable solvent.

Example 2

*Cyclohexyl quinitol*

The following materials were charged into a stainless steel autoclave: 149.2 grams of phenyl-p-benzoquinone, 350 cc. of isopropyl alcohol and 40 grams of wet Raney nickel. Hydrogen was introduced into the autoclave under a pressure of about 1,000 p. s. i., and the reaction mixture was heated at 60 to 70° C. with constant stirring. After about three hours, hydrogenation of the phenyl-p-benzoquinone had resulted in the formation of phenyl hydroquinone. This was evidenced by the cessation of hydrogen absorption. The reaction mixture was then heated to 95 to 105° C. with maintenance of the hydrogen pressure at 1,000 p. s. i.; the phenyl hydroquinone was converted to phenyl quinitol after about four hours under these conditions, as was evidenced by the cessation of hydrogen absorption. Finally, the temperature of the batch was increased to 140 to 150° C. with the maintenance of the hydrogen pressure at 1,000 p. s. i. with continued stirring, at which temperature and conditions the hydrogen absorption began again and continued until the transformation from phenyl quinitol to cyclohexyl quinitol was complete. The last phase of the hydrogenation required about seven hours. Next the autoclave and its contents were cooled and the reaction mixture filtered from the catalyst. The solvent, viz., isopropyl alcohol, was removed by distillation, and the crude product remaining was purified by distillation at 0.5 mm. of Hg pressure. The distillate consisted of 146.6 grams of (91% yield) of cyclohexyl quinitol which was a water-white viscous liquid which slowly crystallized to form a white solid. This crystalline material can be further purified by recrystallization in a manner similar to that indicated in Example 1.

The phenyl quinitol and cyclohexyl quinitol as prepared in accordance with Examples 1 and 2 can be employed in the preparation of ethers and esters. The ethers can be obtained through the use of the same etherification procedures which apply to alcohols in general. Phenyl quinitol or cyclohexyl quinitol can be converted into metallic salts, such as sodium or potassium salts and the salts allowed to react with the appropriate alkyl halide, sulfate, or phosphate according to the well known Williamson ether synthesis. The specific reaction conditions, such as reaction time, temperature, solvent, and so on, are of course dependent upon the properties of the individual ethers. Both mono and di ethers can be formed. In addition to the alkyl ethers referred to, aryl ethers can also be prepared using similar procedures.

In addition to the ethers of phenyl quinitol and cyclohexyl quinitol, the esters thereof are also valuable organic compounds. The esters can be prepared through the use of known esterification procedures which apply to alcohols in general. For example, phenyl quinitol or cyclohexyl quinitol can be reacted with an acid anhydride or an acid chloride in the presence of a catalyst or condensation agent. The specific reaction conditions, such as reaction time, temperatures, solvent, and so on, are of course dependent upon the properties of the individual esters. Both diesters and monoesters can be prepared.

Inasmuch as phenyl quinitol is a new compound, the esters thereof are likewise unknown in the prior art. When an acid anhydride is employed, quantities in excess of the theoretical values are generally advantageously introduced into the reaction mixture. Examples of such acid anhydrides include acetic anhydride, propionic anhydride, hexanoic anhydride, and so on. If desired, it may be advantageous to employ an inert organic solvent for the reactants as a reaction medium. A catalyst can be employed to promote the esterification reaction; however, this is not critical and esterification can be accomplished without the presence of any catalyst. The reaction temperature employed should be above room temperature in order to obtain a satisfactory rate of reaction. However, any elevated temperature below that which causes decomposition can be employed advantageously; reflux temperatures are employed when the boiling temperature of the reaction medium is suitable. The addition of an inert solvent can be utilized to control the reflux temperature if it is not otherwise satisfactory. The time required for complete esterification of phenyl quinitol depends upon the reaction conditions, such as the temperature and the particular ester which is being formed. Normally, about one hour is sufficient to obtain a good yield.

The esters of phenyl quinitol with the lower fatty acids are stable liquids of high molecular weight and as such, have potential value as solvents or plasticizers useful in the formation of synthetic resins. The presence of both an aromatic and an alicyclic nucleus tends to promote compatibility of these esters with either aromatic or aliphatic substances. Esters of the higher fatty acids are in the nature of wax-like solids and can be employed for any of the purposes which are common to compounds possessing such characteristics. In addition to the esters of organic acids, esters of inorganic acids such as phosphoric or sulfuric acid can also be prepared. By suitable modification of reaction conditions, the mono esters can be prepared. In addition to acid anhydrides, other esterification agents, such as acid chlorides or the free acids themselves can be employed in the preparation of esters of phenyl quinitol.

The following examples are presented to further illustrate the manner of practicing this phase of the invention:

EXAMPLE 3

*Phenyl quinitol diacetate*

The following materials were heated under reflux for one hour: 96 grams of phenyl quinitol and 500 cc. of acetic anhydride. Heat was evolved as the reaction commenced and intermittent cooling was necessary in order to maintain a reasonable rate of reflux. After the reflux period had been completed, the batch was cooled and poured into two liters of water to decompose the excess anhydride. After the water slurry had been stirred for about one hour, the product was extracted with benzene. The benzene solution of crude phenyl quinitol diacetate which was obtained was then washed with water and the solvent removed by distillation. The crude product was then purified by distillation at 0.15 mm. of Hg pressure collecting the distillate through a total range of 121–138° C. The product collected was phenyl quinitol diacetate and was an almost water-white viscous liquid weighing 132.7 grams (95% yield).

EXAMPLE 4

*Phenyl quinitol dipropionate*

The following materials were heated under reflux for one hour: 96 grams of phenyl quinitol and 500 cc. of propionic anhydride. The procedure employed was precisely the same as in Example 3 for the preparation of phenyl quinitol diacetate. The crude reaction product was purified by distillation at 0.1 mm. Hg pressure collecting the distillate at 162° C. The yield of phenyl quinitol dipropionate obtained was 108.5 grams. This product was an almost water-white viscous liquid. In addition to the distillate at 162° C., a forerun of 43.5 grams of material was collected which distilled off below 162° C. This forerun probably consisted of isomeric organic compounds.

In a manner similar to that disclosed for the preparation of esters of phenyl quinitol, esters of cyclohexyl quinitol can also be prepared. Inasmuch as cyclohexyl quinitol is a new compound, these esters are likewise unknown in the prior art. Generally speaking, it is most advantageous to employ acid anhydrides as the esterification reactant. However, it is possible to employ the acid chlorides to form the esters as well as the acids themselves. Esters of both lower and higher fatty acids can be so obtained. The reaction conditions and means of purification of the reaction products are generally similar in most regards to those described hereinabove. Thus the reaction temperature need not be carried as high as the reflux temperature of the anhydride as was done in the examples which follow. The reaction could be conducted although at a lower rate at lower temperatures.

The time required for complete esterification of cyclohexyl quinitol depends upon the reaction conditions and the reactants employed; usually one hour is sufficient. Solvents can be employed and catalysts can be employed if desired. In addition to the esters of organic acids, esters of inorganic acids, such as phosphoric or sulfuric acid, can also be prepared. By suitable modification of the reaction conditions, mono esters can also be prepared. The esters of cyclohexyl quinitol with the lower fatty acids are water-white stable liquids of high molecular weight and as such, have value as solvents or plasticizers useful in the preparation of synthetic resins. The esters of the higher fatty acids are wax-like solids and have utility in accordance with such properties. The following examples further illustrate the manner of practicing this phase of the invention.

EXAMPLE 5

Cyclohexyl quinitol diacetate

The following materials were heated under reflux for one hour: 88 grams of cyclohexyl quinitol and 500 cc. of acetic anhydride. Heat was evolved as the reaction started and intermittent cooling was necessary in order to maintain a reasonable rate of reflux. After the reflux period had been completed, the batch was cooled and poured into two liters of water to decompose the excess anhydride. After the water slurry had been stirred for about one hour, the product was extracted with benzene. The benzene solution of crude cyclohexyl quinitol diacetate was washed with water and the solvent removed by distillation. The crude product so obtained was purified by distillation at 0.14 mm. of Hg pressure, collecting the distillate to a total range of 115–135° C. The yield of purified cyclohexyl quinitol diacetate obtained was 120.2 grams (96% yield). This product was a water-white liquid.

EXAMPLE 6

Cyclohexyl quinitol dipropionate

The following materials were heated under reflux for one hour: 88.8 grams of cyclohexyl quinitol and 500 cc. of propionic anhydride. Precisely the same procedure was employed in treating this mixture as in Example 5 above. The crude reaction product was purified by distillation at 0.1 mm. of Hg pressure, collecting the distillate over a total temperature range of 136–145° C. The distillate can be further purified by fractionation if desired. In addition to the initial distillate collected through the above temperature range, there was a small fraction which distilled at a lower temperature and which probably consisted of isomeric materials.

In addition to the preceding compounds which can be prepared by the hydrogenation of phenyl-p-benzoquinone followed by etherification or esterification of such compounds, phenyl-p-benzoquinone can also be chlorinated to form the trichloro derivative by the substitution of chlorine on the quinone nucleus so as to produce a good yield, and this product can then be hydrogenated so as to form 2-phenyltrichlorohydroquinone. In order to accomplish this preparation, phenyl-p-benzoquinone can be dissolved in a suitable chlorination solvent such as an aqueous solution of acetic acid containing 75 per cent acetic acid by volume. The solution of phenyl-p-benzoquinone can then be heated under reflux at 100–103° C. and chlorine passed through the hot solution for 1½ hours. It has been established that under these conditions a trichloro derivative of the original phenyl-p-benzoquinone is produced which can be isolated by cooling the reaction mixture and filtering off the product with subsequent filtration. Thus 50 grams of phenyl-p-benzoquinone, 508 cc. of acetic acid, and 170 cc. of water can be subjected to the treatment described so as to produce 74.2 grams (93% yield) of 2-phenyltrichlorobenzoquinone which, upon recrystallization from methanol has a melting point of 107.5–108° C. Of course it is obvious that temperatures above and below the reflux temperature can be employed and that other solvents than acetic acid solution in water can be utilized. 2-phenyltrichlorobenzoquinone can be hydrogenated or otherwise reduced so as to produce 2-phenyltrichlorohydroquinone by any of several well known hydrogenation or reduction processes. For example, the desired reduction can be accomplished through the use of such common reagents as zinc dust and acetic acid, zinc dust and hydrochloric acid, iron powder and acetic or hydrochloric acids, etc. Such reduction can also be accomplished through catalytic hydrogenation as described hereinabove. Thus, two grams of 2-phenyltrichlorobenzoquinone was dissolved in a heated aqueous solution containing 75 per cent acetic acid by volume and four grams of zinc dust was added until the yellow color of the quinone had been removed; after filtration from the excess zinc dust and cooling, the product was isolated as a white solid weighing 1.2 grams having a melting point of 132–133.5° C. This product was phenyltrichlorohydroquinone.

Both of the above products, namely, 2-phenyltrichlorobenzoquinone and 2-phenyltrichlorohydroquinone, are of value in the preparation of compositions useful as fungicides and insecticides. These compounds can also be employed in the preparation of insect repellants. Furthermore, these compounds can be used as intermediates in the preparation of dyes. The benzoquinone derivative can be employed in the prevention of mildew and as a germicide; the hydroquinone derivative can also be employed in the preparation of insect repellants. For many of these uses, the hydroquinone derivative possesses outstanding properties which may be attributed to the fact that the compound possesses two phenolic hydroxyl radicals in para relationship.

In addition to the preparation of phenyl quinitol and cyclohexyl quinitol, as described in Examples 1 and 2 above, these compounds can be also prepared employing pressures such as 100 p. s. i. and temperatures such as 105° C. in preparing phenyl quinitol and temperatures such as 160° C. in preparing cyclohexyl quinitol. Similarly, a pressure of 2,000 p. s. i. and a temperature of 95° C. can be used in preparing phenyl quinitol and a similar pressure at a temperature of 135° C. can be used in preparing cyclohexyl quinitol. More advantageously, pressures of from about 250 to about 1,500 p. s. i. can be employed. Other catalysts such as those precious metal catalytic compositions of matter described above can also be employed. Furthermore, an alkyl ether such as diethyl ether or other alcohols such as ethyl alcohol can be employed as the inert diluent.

What I claim as my invention is:

1. A process for preparing hydrogenated derivatives of phenyl hydroquinone which comprises reacting a compound selected from the group consisting of phenyl-p-benzoquinone, phenyl hydroquinone, and phenyl quinitol, with hydrogen under a pressure of from about 100 to about 2,000 pounds per square inch, in a closed vessel at a temperature of from about 95° C. to about 160° C. in the presence of a hydrogenation catalyst selected from the group consisting of nickel and precious metal catalytic compositions of matter, and in the presence of an inert diluent, whereby any phenyl-p-benzoquinone and phenyl hydroquinone is converted into phenyl quinitol at a temperature of from about 95° to about 105° C., and any phenyl quinitol is converted into cyclohexyl quinitol at a temperature of from about 135° to about 160° C.

2. A process as defined in claim 1 wherein the inert diluent is a lower aliphatic alcohol.

3. A process as defined in claim 2 wherein the hydrogenation catalyst is Raney nickel.

4. A process as defined in claim 3 wherein the hydrogen pressure is about 1,000 pounds per square inch.

5. A process for preparing phenyl quinitol which comprises reacting phenyl hydroquinone with hydrogen under a pressure of from about 250 to about 1,500 pounds per square inch, in a closed vessel at a temperature of from about 95° to about 105° C. in the presence of a Raney nickel hydrogenation catalyst and in the presence of an inert diluent.

6. A process as defined in claim 5 wherein the inert diluent is a lower aliphatic alcohol.

7. A process as defined in claim 6 wherein the hydrogen pressure is about 1,000 pounds per square inch, the inert diluent is isopropyl alcohol, and the reactants are agitated under the reaction conditions until hydrogen absorption has substantially ceased.

8. A process for preparing cyclohexyl quinitol which comprises reacting phenyl quinitol with hydrogen under a pressure of from about 250 to about 1,500 pounds per square inch, in a closed vessel at a temperature of from about 135° to about 150° C. in the presence of a Raney nickel hydrogenation catalyst and in the presence of an inert diluent.

9. A process as defined in claim 8 wherein the inert diluent is a lower aliphatic alcohol.

10. A process as defined in claim 9 wherein the hydrogen pressure is about 1,000 pounds per square inch, the inert diluent is isopropyl alcohol, and the reactants are agitated under the reaction conditions until hydrogen absorption has substantially ceased.

References Cited in the file of this patent

Beilstein, "Handbuch der Organischen Chemie," vol. 6, 1st Suppl., page 467 (1931); vol. 9, 1st Suppl., page 74 (1932).